US010114369B2

(12) United States Patent
Newell et al.

(10) Patent No.: US 10,114,369 B2
(45) Date of Patent: Oct. 30, 2018

(54) IDENTIFYING INTEGRATED CIRCUIT ORIGIN USING TOOLING SIGNATURE (71) Applicant: Microsemi SoC Corporation, San Jose, CA (US)

(72) Inventors: G. Richard Newell, Tracy, CA (US); Russell Robert Garcia, Orange, CA (US)

(73) Assignee: MICROSEMI SOC CORPORATION, San Jose, CA (US)

( * ) Notice: Subject to any disclaimer, the term of this patent is extended or adjusted under 35 U.S.C. 154(b) by 283 days.

(21) Appl. No.: 14/747,758

(22) Filed: Jun. 23, 2015

(65) Prior Publication Data

US 2015/0370247 A1 Dec. 24, 2015

Related U.S. Application Data (60) Provisional application No. 62/016,290, filed on Jun. 24, 2014.

(51) Int. Cl.
*G05B 19/418* (2006.01)

(52) U.S. Cl.
CPC .......... *G05B 19/41875* (2013.01); *G05B 2219/32222* (2013.01); *Y02P 90/22* (2015.11)

(58) Field of Classification Search
None
See application file for complete search history.

(56) References Cited

U.S. PATENT DOCUMENTS 6,446,242 B1   9/2002 Lien et al.
6,904,527 B1   6/2005 Parlour et al.
(Continued)

FOREIGN PATENT DOCUMENTS

GB    2499985 A       9/2013
WO   2004006071       1/2004

OTHER PUBLICATIONS

H. Huang, "The Detection of Counterfeit Integrated Circuit by the Use of Electromagnetic Fingerprint", Sep. 1-4, University of Toulouse, 2014 International Symposium on Electromagnetic Compatibility, 1118-1122.*

(Continued)

*Primary Examiner* — Reema Patel
*Assistant Examiner* — Steven Christopher
(74) *Attorney, Agent, or Firm* — Glass & Associates; Kenneth D'Alessandro; Kenneth Glass (57) ABSTRACT A method for determining if an individual integrated circuit was manufactured using an individual instance of tooling includes collecting from the individual integrated circuit first data representing at least one attribute that varies as a function of the tooling used to manufacture the individual integrated circuit and second data identifying the integrated circuit as having been manufactured using the individual instance of tooling. The first data is compared to a signature of the individual instance of tooling identified by the second data. The signature is derived from the at least one attribute measured from a population of integrated circuits that were manufactured using the individual instance of tooling. The individual integrated circuit is identified as having been manufactured using the individual instance of tooling identified in the second data collected from the individual integrated circuit if the first data correlates to the signature by a predetermined threshold.

17 Claims, 3 Drawing Sheets

(56) References Cited

U.S. PATENT DOCUMENTS

| | | |
|---|---|---|
| 7,406,716 B2 | 7/2008 | Kanamori et al. |
| 7,716,497 B1 | 5/2010 | Trimberger et al. |
| 7,719,497 B2 | 5/2010 | Jeon et al. |
| 7,778,502 B2 | 8/2010 | Hiruta et al. |
| 7,788,502 B1 | 8/2010 | Donlin et al. |
| 8,427,193 B1 | 4/2013 | Trimberger et al. |
| 8,547,136 B1 | 10/2013 | Guilloteau et al. |
| 8,729,922 B2 | 5/2014 | McElvain et al. |
| 8,949,586 B2 | 2/2015 | Grieco et al. |
| 9,009,492 B2 | 4/2015 | Belenky et al. |
| 2002/0150252 A1 | 10/2002 | Wong et al. |
| 2002/0199110 A1 | 12/2002 | Kean et al. |
| 2003/0159047 A1 | 8/2003 | Smeets et al. |
| 2003/0172268 A1 | 9/2003 | Walmsley et al. |
| 2004/0177050 A1 | 9/2004 | Athens et al. |
| 2004/0190868 A1 | 9/2004 | Nakano et al. |
| 2004/0255152 A1 | 12/2004 | Kanamori et al. |
| 2006/0107320 A1 | 5/2006 | Bhatt et al. |
| 2007/0107056 A1 | 5/2007 | Frank et al. |
| 2007/0233982 A1 | 10/2007 | Chen et al. |
| 2008/0022108 A1 | 1/2008 | Brannock et al. |
| 2008/0148001 A1 | 6/2008 | Gehrmann et al. |
| 2008/0312858 A1 * | 12/2008 | Baseman .......... G05B 19/41875 702/83 |
| 2009/0132624 A1 | 5/2009 | Haselsteiner et al. |
| 2009/0144559 A1 | 6/2009 | Lee et al. |
| 2010/0031026 A1 | 2/2010 | Cizas et al. |
| 2010/0082987 A1 | 4/2010 | Thom et al. |
| 2010/0174920 A1 | 7/2010 | Buckingham et al. |
| 2010/0198896 A1 | 8/2010 | Hoefler et al. |
| 2011/0029779 A1 | 2/2011 | Sekiya et al. |
| 2011/0088100 A1 | 4/2011 | Rutman et al. |
| 2011/0099361 A1 | 4/2011 | Shah et al. |
| 2011/0296440 A1 | 12/2011 | Laurich et al. |
| 2012/0210115 A1 | 8/2012 | Park et al. |
| 2012/0210124 A1 | 8/2012 | Lieber et al. |
| 2012/0221864 A1 | 8/2012 | Ciet et al. |
| 2012/0311314 A1 | 12/2012 | Cumming et al. |
| 2013/0081144 A1 | 3/2013 | Kambayashi et al. |
| 2014/0040625 A1 | 2/2014 | Belenky et al. |
| 2014/0247944 A1 | 9/2014 | Kocher et al. |

OTHER PUBLICATIONS

"OpenCore Evaluation of AMPP Megafunctions,2", Altera Corporation, "OpenCore Evaluation of AMPP Megafunctions," Application Note 343, Version 1.0, Feb. 2004, 6 pages.

"OpenCore Plus Evaluation of Megafunctions", Altera Corporation. "OpenCore Plus Evaluation of Megafunctions," Application Note 320, Version 1.6, Nov. 2007, 10 pages.

McGrew, "Efficient authentication of large, dynamic data sets using Galois/Counter Mode {GCM}", David McGrew, "Efficient authentication of large, dynamic data sets using Galois/Counter Mode {GCM}," Proceedings of the Third IEEE International Security in Storage Workshop, 2005.

* cited by examiner

IDENTIFYING INTEGRATED CIRCUIT ORIGIN USING TOOLING SIGNATURE

CROSS-REFERENCE TO RELATED APPLICATIONS

This application claims the benefit of U.S. Provisional Patent Application No. 62/016,290 for "Identifying Integrated Circuit Origin Using Tooling Signature" filed Jun. 24, 2014, the contents of which are incorporated in this disclosure by reference in their entirety.

BACKGROUND OF THE INVENTION

Field of the Invention

The present invention relates to integrated circuit technology. More particularly, the present invention relates to identifying that an integrated circuit has been manufactured using particular tooling.

Description of Related Art

Individual instances of the tooling used to produce integrated circuits results in nano- or atomic-scale differences in the manufactured integrated circuits (ICs) caused by uncontrollable differences introduced during the manufacturing of the tooling, when compared to integrated circuits manufactured using otherwise identical tooling produced from the same data. These differences are intentionally minimized to a point where they have no detrimental effect on the use of the tooling for its main intended purpose, i.e., to produce functional integrated circuits. Each copy of the tooling, even though not perfectly identical due to the inevitable uncontrolled unique variations from tool to tool, can all produce functional, nearly identical ICs.

Modern integrated circuits are produced with the aid of a photographic tool called a reticle, which includes geometric designs used to perform one process step, for example, to pattern a single implant or metal layer, for a single die or a small number of dice. The reticle is stepped across an entire wafer to pattern all the dice on the wafer. Even though the reticle may be thought of as one tool, if it includes nominally "identical" designs for patterning more than one IC at a time (as is usually the case unless the IC is exceptionally large where only one fits on the reticle), for the purposes of this invention, each of the copies of the design, even within a single reticle, will be considered as a particular instance of the tool. Some integrated circuit manufacturers keep records identifying the position on the wafer of the individual semiconductor die, and from this data and the stepping algorithm that was used, the specific instance of the tool used to produce a die is known.

In the prior art, watermarks can be intentionally introduced into tooling so that the individual ICs produced by each set of tooling can be readily identified by someone knowing the watermark. However, if a watermark can be intentionally introduced by the legitimate IC manufacturer, then it can also be cloned by an adversary.

Another prior art technique that can be used in this manner is known as physically unclonable function (PUF) technology. A PUF identifies the unique characteristics of each device, not the nearly invisible common characteristics imparted by the tooling. From a PUF point-of-view, this tooling-related correlation from device-to-device is undesirable as it reduces slightly the entropy exhibited by each device. In practice, the tooling-related correlation is so low that it does not materially affect PUF performance.

The need to ensure that an IC is from a trusted source, and is not a cloned device produced by an adversary, remains a vexing problem for both military and commercial applications. As production moves to ever more expensive facilities, which may not necessarily function under the desired security procedures demanded by the ultimate customer, this need becomes acute. What is needed, and not provided by the prior art, is a method to confirm that a received IC, or batch of ICs, are actually manufactured from trusted tooling, despite the manufacturing facility for the ICs not meeting the required security procedures.

SUMMARY OF THE INVENTION

The present invention takes advantage of the inevitable small variations in the tooling that are not only difficult to identify (like a good watermark), but also nearly impossible to clone (like a good PUF). In methods according to the present invention, data is measured from an IC and, with the aid of statistical analysis, is used to identify whether or not the IC was produced using specific instances of tooling (such as specific photographic masks and reticles). The present invention can be used to help identify counterfeit ICs.

Additional advantages and details of the invention are explained below with reference to the exemplary embodiments illustrated in the accompanying schematic figures, in which like reference numbers identify like parts throughout.

DESCRIPTION OF THE INVENTION

Persons of ordinary skill in the art will realize that the following description of the present invention is illustrative only and not in any way limiting. Other embodiments of the invention will readily suggest themselves to such skilled persons.

Each instance of the tooling used to produce integrated circuits is inevitably unique, even though multiple copies of the tool, for example a multi-die reticle, are fabricated from the same data. Each tool has unique nano- or atomic-scale variations making it different from every other such tool, analogous to a biometric characteristic of a person like a fingerprint or signature. The individual tool leaves its fingerprint or signature on each integrated circuit it is used to produce. The terms "fingerprint" and "signature" are used interchangeably herein.

The inventors have discovered that at least some of these signatures can be detected by measurements of the integrated circuit, thus binding those tools used to produce an IC to an individual IC. The present invention binds the IC with at least some of the tooling used to produce it, such as the reticles that control certain process steps during the manufacturing of the IC. Depending on what particular feature of the integrated circuit is measured, for example metal resistance of an upper layer metal traces, or transistor threshold voltages, the different tooling used at different process steps may have a larger or smaller effect on the particular measurement chosen. It is believed to be nearly impossible to produce a clone of the tooling that would give the same identifiable signature in the devices produced. Attempts to do so are likely to fall short or overshoot, and can be detected. It is also believed to be nearly impossible to modify modern day tooling. If a change to the tooling is required, for example if there were a mistake that needed correcting, the entire tool is remanufactured from corrected source data. Similarly, if an adversary wishes to modify a design, for example to insert a Trojan Horse, they will remanufacture and replace some of the tools used at certain process steps in the manufacture of the ICs. In this case, the new tool(s) will exhibit a different signature than the one(s) replaced, even if large parts of the design are nominally unchanged, since the variations in the tools are unintentional and uncontrollable during the tool fabrication process. The signature has some similarity to a watermark, because it is itself very difficult to detect, thus making duplication even more difficult. If the signatures of all authorized tools are known, then it becomes possible to identify which of the authorized tools was used to produce a given device or a population of devices. If the signature is not from one of the authorized tools, then counterfeits produced using different tools may be presumed.

Thus, the present invention may be employed to detect and counter the effects of an adversary producing undetected counterfeit ICs, either for economic incentives, or to adversely affect the security of the system they are used in, such as with the surreptitious inclusion of a Trojan Horse circuit (e.g., a back-door or kill-switch).

The present invention can be used with existing products having enough memory (or other measurable fingerprint) to produce an identifiable signature from at least a subset of the tools used in manufacturing the products.

While the disclosure herein is in the context of a FPGA IC, the principles of the present invention can also be used with other IC devices such as, but not limited to, application specific ICs (ASICs) or system-on-a-chip ICs (SoCs).

The present invention takes advantage of the unique tool-dependent fingerprints or signatures. It does so, not by measuring the tool, but by measuring the nano- or atomic-scale imprint (or "shadow") the tool makes on the ICs it is used to produce. As previously noted, some of the uniqueness of the tool is transferred to the ICs, which the tool helps to produce. These very small unintended and uncontrollable variations are measured, with the aid of statistical methods, to determine with some practically useful level of assurance, which of several tools (or reticle positions) the IC was produced from, or perhaps even more importantly, to determine with some assurance level that the IC was not produced by any of the tools for which a fingerprint is known, thus possibly identifying counterfeit ICs (or at least a given batch of the device, depending on whether a signature requires one or more than one device to reliably identify it) that were produced with unfamiliar tooling having a unique signature of its own.

In one embodiment of the invention, the measurement of the IC that is used as a signature is taken from the start-up values of multiple complimentary metal-oxide-semiconductor (CMOS) static random access memory (SRAM) memory cells on the IC. As is well known in the prior art, the preferred start-up state of each individual SRAM cell is dependent upon unique physical variations created in individual circuits on the IC during its manufacture. Thus, it is known that an SRAM can be used to build a physically unclonable function (PUF) that is like a "fingerprint" of the IC. Because the preferred start-up state of each SRAM cell is largely uncorrelated with any other cell on the same or on other ICs, by taking a sufficient number of these bits (from a few hundred to a few thousand), an IC can be identified, and with some additional signal processing and the use of some "helper data" stored in non-volatile memory, a unique repeatable secret key can be extracted from these start-up values.

In the prior art, it was assumed that the SRAM preferred start-up values were almost completely uncorrelated from IC to IC. What this embodiment of the invention recognizes is that, while this is nearly true, there are traces, in the form of extremely small correlations, which reflect the unique variations in the tooling that was used in patterning the SRAM circuits onto the IC. Thus, by examining a relatively large number of SRAM bits (e.g., several hundred thousand to over a million) it is possible to correlate the start-up values of the SRAM produced by an individual tool (e.g., a certain die position on the reticle used to photolithographically pattern the features of the circuit elements), and to differentiate it from the SRAM produced by other tools (e.g., all the other reticle die positions, or a counterfeit reticle). These tooling-related correlations are small enough that they do not affect the primary function of the IC (e.g., the function of the SRAM to store data), and even so small that they do not appreciably reduce the entropy of the SRAM start-up values which might otherwise affect their suitability for use in an SRAM-PUF.

Figure 1:
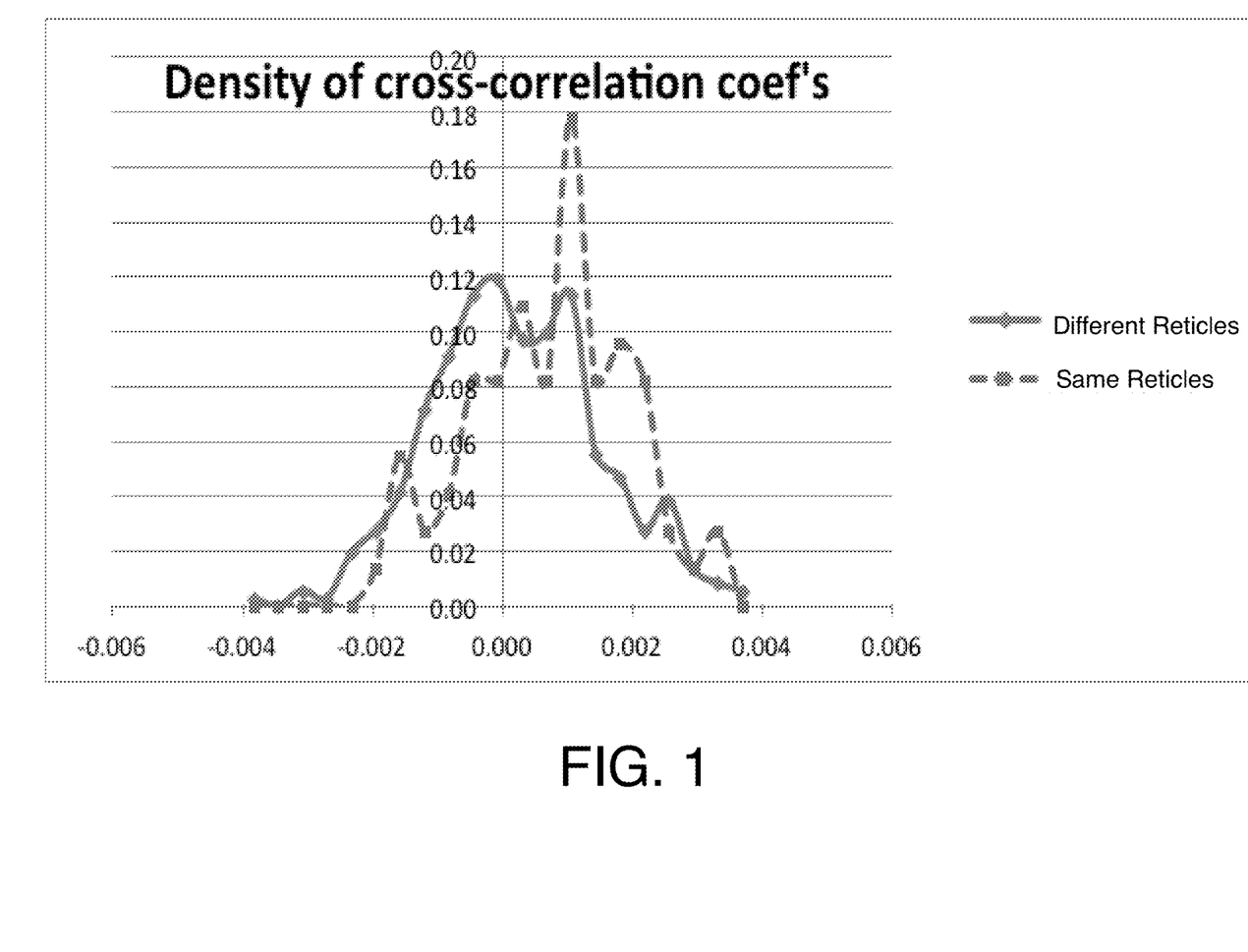
FIG. 1 is a histogram showing SRAM startup data taken from 30 SmartFusion2-050 FPGA devices.

Referring to FIG. 1, a histogram shows the data taken from a population of 30 FPGA devices manufactured by Microsemi SoC Corporation. The start-up values from all of the large SRAM (LSRAM) blocks on each IC, approximately 1.1 million bits per device, were recorded. The values from each IC were cross-correlated with the SRAM start-up values from every other IC, resulting in 435 pairings. The particular device measured is produced on a six-die reticle. The specific position on the reticle (one of six) for each of the 30 devices was identified from production records. The 435 pairings were split into two groups. In one group, represented by the solid trace in FIG. 1, the two devices were from different reticle positions from each other (362 pairings), and in the other group, represented by the dashed trace in FIG. 1, the two devices had been produced by the same reticle position (73 pairings).

For the group where the devices were from different reticle positions the mean cross-correlation of all the pairings was very near zero, as expected. This could be thought of as a control group. For the group where the devices were from the same reticle position, the cross-correlation of all the pairings was slightly positive, supporting the hypothesis that the start-up values were correlated because of the common tooling used to produce the pairs of devices in this group. The histogram of FIG. 1, along with Table 1 below, shows the distribution of the cross-correlations for all the pairings in the two groups.

TABLE 1

Cross-correlation of all units to all other units made with different reticles vs. that from all units to all other units made with the same reticle

|  | Different | Same | Welch's T-test (σ) | Degrees of Freedom |
|---|---|---|---|---|
| Mean | 0.000036 | 0.000531 | 3.161254 | 108.0548 |
| Variance | 1.672E−06 | 1.4563E−06 | | |
| Count | 362 | 73 | | |
| | | | T-test Probability 0.10% | |

Although the effect was not very large, a Welsh's T-test confirms that the probability that the mean correlation is randomly shifted by the observed amount is only 0.1%. This is approximately a three sigma event and demonstrates quite a strong significance, even with the very small overall sample size of 30 devices where there were only a few devices, (from a minimum of two to a maximum of eight), produced by each of the six reticle positions. With larger sample sizes, or devices with both smaller geometries and a larger number of memory bits, it is anticipated that much better signatures can be recorded, improving the statistical significance. Ideally, the data from a single device-under-test compared to a signature measured from a modest population of known-good devices is enough to strongly confirm whether it was produced on the reticle it purports to be from, or if it was produced using another known mask (a situation which should not occur), or using an unknown tool, thus indicating a possible counterfeit device. The number of devices in the known-good (control) group and the signal-to-noise ratio of the measurements will determine the level of assurance that can be obtained from a single device-under-test. For example, persons of ordinary skill in the art will appreciate that where the signal-to-noise ratio of the signature is large enough, a known-good (control) group or population of devices can include a single device. Even in the case of very poor signal-to-noise conditions, it may still be possible to provide some useful level of assurance that a small group of test devices have likely been manufactured using the known tooling.

Figure 2:
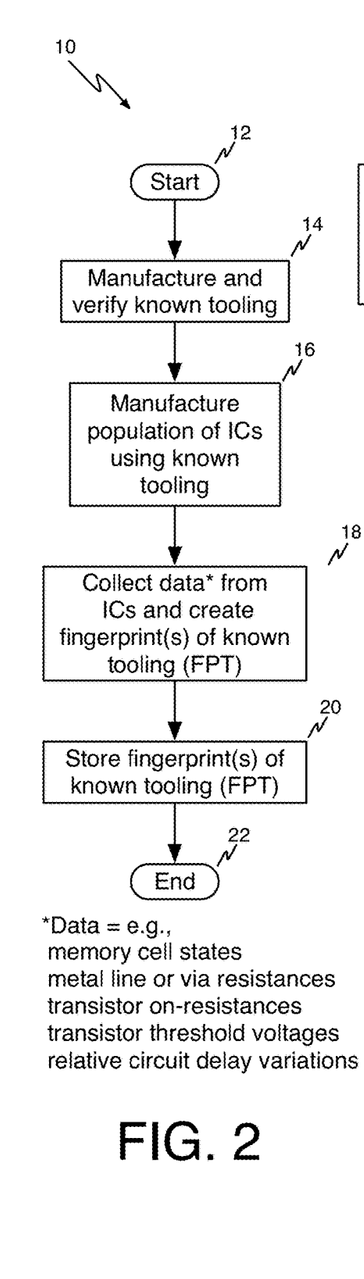
FIG. 2 is a flow diagram showing an illustrative embodiment of a method for creating a fingerprint for known tooling according to the present invention.

Referring now to FIG. 2, a flow diagram shows an illustrative embodiment of a method 10 for creating a fingerprint for known tooling according to the present invention. Preferably, the method is run on a computer or work station having a processor and a memory, the memory storing the method in electronically readable instructions, which when read by the processor, cause the processor to perform the method.

The method starts at reference numeral 12. At reference numeral 14, the known tooling is manufactured and verified. At reference numeral 16, a population of ICs is manufactured using the known tooling. At reference numeral 18, data related to a parameter that varies as a function of the tooling used to manufacture the IC is measured in the ICs in the population of manufactured ICs, and a fingerprint(s) or signature(s) is created for the known tooling. In one embodiment of the present invention, a different fingerprint or signature is created from populations of ICs produced using each of a plurality of positions on a reticle that is stepped across a wafer to create geometric patterns for forming the features of the electronic circuits contained on the ICs. The signature may comprise all of the raw measurement data collected from the entire population of devices known to be produced by the particular tool or reticle position, or the signature may be kept in some processed and compressed representation, such as the average values of measurements from the devices in the population. The best form to process and store the signature in will depend to a large degree on the design of the classification algorithm that is ultimately used to determine if devices are authentic or counterfeit, as well as practical considerations, such as the amount of storage space available.

At reference numeral 22, the fingerprint(s) is stored in memory for later comparison to individual ICs. The method ends at reference numeral 22. Thus, in one embodiment, the initial state of some or all CMOS SRAM cells on the ICs produced using each instance of the tooling are read, and stored as potential start-up states for the ICs produced on the individual instances of the tooling. This range of potential start-up states from the ICs produced using a particular instance of the tooling is then the fingerprint or signature of that instance of the tooling. In one non-limiting embodiment, the fingerprint or signatures are each stored associated with data identifying the producing reticle.

Figure 3:
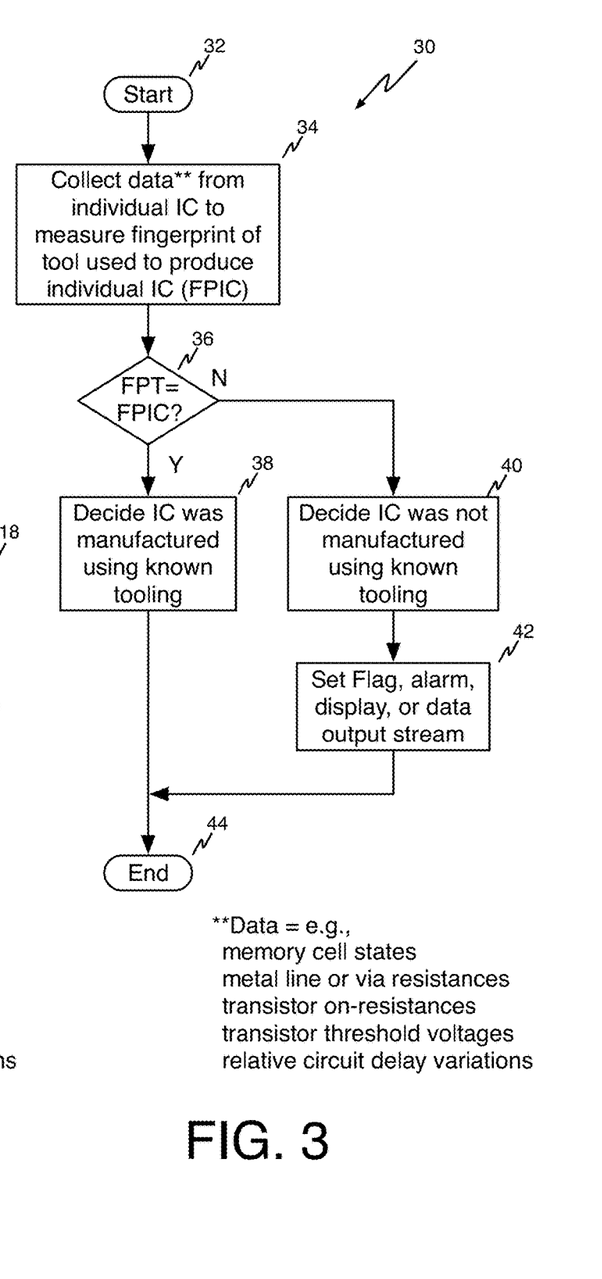
FIG. 3 is a flow diagram showing an illustrative embodiment of a method according to the present invention for determining whether an individual IC was manufactured using known tooling.

Referring now to FIG. 3, a flow diagram shows an illustrative embodiment of a method 30 according to the present invention for determining whether an individual IC was manufactured using known tooling. Preferably, the method is run on a computer or work station, having a processor and a memory, the memory storing the method in electronically readable instructions, which, when read by the processor, cause the processor to perform the method. The method starts at reference numeral 32. At reference numeral 34, the signature of the individual IC or batch of ICs is measured by collecting data from the individual IC or batch of ICs and processing the data in the computer to develop a signature of the individual IC or batch of ICs. At reference numeral 36, the signature measured from the individual IC is compared to the signature of the population of ICs manufactured using the known tooling. The computer retrieves the data stored in the method of FIG. 2 and compares the data to the signature developed for the individual IC or batch of ICs. In embodiments of the invention where the fingerprint or signature is derived from reticle position indicia, the data obtained from the individual IC may include data stored in the IC or elsewhere, identifying the reticle position of the die on the wafer. In such an embodiment, the fingerprint or signature obtained from the individual IC may be compared with the signature derived from the instance of tooling corresponding to the reticle position of the die. In other embodiments, the fingerprint or signature obtained from the individual IC may be compared with the signatures derived from the instances of tooling corresponding to each reticle position to determine if there is a close enough correlation to one of them. Here, the term "correlation" should be taken broadly as any appropriate matching or classification algorithm.

One possible classifier algorithm is one that correlates (using the common statistical definition) the raw measured data from the device-under-test (DUT) IC (or ICs) to all the raw measured data from all the ICs in the control group manufactured using the same tool(s) as the DUT was purportedly made from, forming one set of correlation intermediates. The DUT measurement is also correlated to all the raw measured data from all the ICs in the control group made using a different tool (or set of tools) as the DUT was purportedly manufactured from, forming a second set of correlation intermediates, the control group. Then, the distributions of these two sets of correlation intermediate results can be examined using well-known statistical techniques such as their mean, their standard deviation, and statistical tests such as Welch's T-Test to determine whether there is any statistically significant indication that the device was manufactured using the purported tooling. Many other classification algorithms and statistical tests of significance will present themselves to those skilled in the art. The exact form in which the signature from the control group(s) are stored, and the classification algorithm used, will likely be interdependent. In the above example, all the raw measurement data was stored. In a different scheme, it is possible that the signature data may be compressed in some way, for example by storing only averages of a multitude of raw measurements.

If the DUT measurement matches the signature within a predetermined threshold, the decision is made at reference numeral 38 that the IC was manufactured using the known tooling. If the signature does not match within the predetermined threshold, the decision is made at reference numeral 40 that the IC was not manufactured using the known tooling, and at reference numeral 42, the computer outputs a signal indicating that the IC was not manufactured using the known tooling. The output signal may comprise an alarm or a display or an output data stream. The method ends at reference numeral 44.

It is believed that SRAM start-up values are the first known measurement of an IC proven experimentally to exploit tool-to-tool unintended and uncontrolled (and, hence, unclonable) variations. Applicants envision that there are other measureable effects that can be similarly exploited, such as metal or via resistance variations, transistor threshold voltages, transistor switch on-impedance variations, relative circuit delay variations, without limitation, that reflect a slight shadow of the unique tooling used to produce the circuits that exhibit these effects.

The present invention binds an IC with the tooling used to produce it, once a signature for the tooling is established using "golden" (trusted) devices, i.e. those used to produce the fingerprint or signature of FIG. 2. It is believed nearly impossible to produce a clone of the tooling that would give the same identifiable fingerprint in the devices produced. Attempts to do so are likely to fall short or overshoot, and can be easily detected. For example, the average number of occurrences of "ones" and "zeroes" in the SRAM start-up values normally falls in a very narrow range around 50:50 (%). The correlations induced by the tooling are sublimely subtle and very widely distributed. If a batch of counterfeit ICs were designed to give them a known fingerprint, it is very likely that some of the bits intentionally biased would fall outside the normal distribution, and this could be detected from a relatively low number of units.

The reticle signature has some similarity to a watermark, because it is itself very difficult to detect, thus making cloning even more difficult. It is not known which, if any, of the million bits have a greater influence in the correlations computed for each reticle. While this could undoubtedly be determined with enough test data from enough devices, it may take data from tens of thousands of devices to pull this information up from the noise floor. Obtaining data from such a large number of devices is another obstacle that stands in the way of an adversary attempting to spoof the classification obtained.

Watermarks can be intentionally introduced into tooling so that the ICs produced by each set of tooling could be readily identified by someone knowing the watermark. However, if they can be intentionally introduced by the legitimate component manufacturer, then they can also be cloned by the adversary. This is not to imply that watermarking cannot also serve a useful security purpose. But reticle fingerprinting goes further than a tooling watermark, it takes advantage of unclonable variations in the tooling that, like a good watermark, are not only difficult to identify, but are nearly impossible to clone (like a good PUF).

Microsemi SoC Corporation, the assignee of the present invention, encodes the (x,y) location in the wafer that each die comes from in certified data that is stored in the individual devices, thus also identifying which reticle position was used in patterning it. However, this data is stored only in encrypted form, making it essentially useless to an adversary. Without access to this data, classifying the reticle fingerprints which are already so subtle, will be substantially more difficult. When attempting to classify a device as legitimate or counterfeit, a manufacturer such as Microsemi SoC Corporation has the benefit of knowing which specific reticle it is purportedly from. Therefore, only a binary decision has to be made. Because the (x,y) data is certified, it is difficult to forge since a private certificate signing key used by the manufacturer would need to be known by the adversary. Cloned certificates can be detected because legitimate certificates are bound to other secret device-specific data, such as a PUF.

Figure 4:
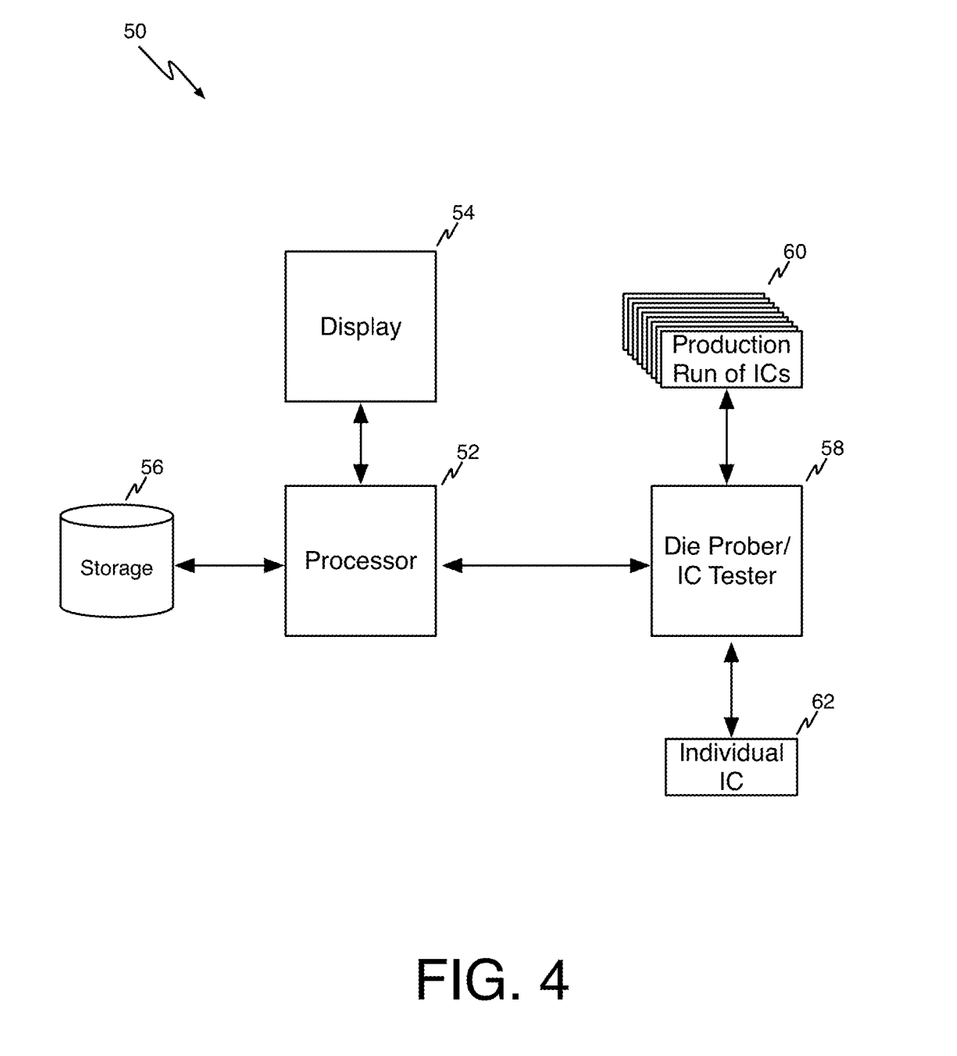
FIG. 4 is a block diagram of an illustrative inspection system that may be used in implementing the present invention.

Referring now to FIG. 4, a block diagram shows an illustrative inspection system 50 that may be used in implementing the present invention. Inspection system 50 includes a processor 52 coupled to a memory 54 and storage 56. Conventional processing, memory, and storage elements may be employed as processor 52, memory 54, and storage 56. A die prober/IC tester 58 is coupled to the processor 52 to collect pertinent data from the IC or batch of ICs. Die prober/IC tester 58 may be a conventional automated testing system. This data does not have to be collected at the production stage. It may be done much later, for example on packaged parts. Accordingly, in some embodiments, persons of ordinary skill in the art will appreciate that a formal testing machine is not necessarily required. For example, the ICs may just be programmed to read out the memory over a USB, UART, or some other built-in interface, to a conventional PC where it is recorded.

As shown at reference numeral 60, die prober/IC tester 58 is used to test a production run or other sample population of known trusted integrated circuits to obtain data related to an attribute of the integrated circuits that will be used to generate the fingerprint or signature. As previously noted, in one illustrative and non-limiting embodiment of the invention, the data is the initial turn-on states of some or all of the SRAM memory cells that are on the integrated circuit. This data or some processed or compressed representation of it is stored in storage 56. Later, data related to the same attribute is collected from an individual integrated circuit as represented by reference numeral 62. The processor uses the stored data and the data from the individual integrated circuit to make a determination of whether the individual integrated circuit was produced using the known tooling.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

The invention claimed is:

1. A method for identifying an individual integrated circuit as having been manufactured using pre-determined instances of known tooling, each instance having unique uncloneable variations in at least one electrical attribute as a result of their manufacture using the pre-determined instances of known tooling, the method comprising:

providing a population of integrated circuits that were manufactured utilizing at least one pre-determined instance of the known tooling;

operating each integrated circuit from the population of integrated circuits and non-destructively measuring the at least one electrical attribute from each integrated circuit from the population of integrated circuits that were manufactured utilizing the at least one pre-determined instance of the known tooling, the at least one electrical attribute representing an uncloneable electrical parameter associated with individual circuit features of the integrated circuit resulting from the instances of known tooling, the electrical attribute obtained by directly electrically contacting the integrated circuit with a die prober and measuring an electrical parameter of at least one component of the integrated circuit;

deriving a signature of the at least one pre-determined instance of the known tooling from the at least one measured electrical attribute from the population of integrated circuits;

operating the individual integrated circuit and non-destructively measuring the at least one electrical attribute from the individual integrated;

storing the at least one electrical attribute from the individual integrated circuit in machine-readable form;

correlating the stored derived signature and the stored at least one attribute from the individual integrated circuit using electronically readable instructions running in a processor, the processor identifying the individual integrated circuit as having been manufactured using the at least one pre-determined instance of the trusted known tooling if the first data correlates to the signature by a predetermined threshold, else identifying the individual integrated circuit as not having been manufactured using the at least one pre-determined instance of the known tooling if the first data does not correlate to the signature by the predetermined threshold; and the processor responding to the electronically readable instructions by outputting an alarm signal if the first data does not correlate to the signature by the predetermined threshold.

2. The method of claim 1, wherein:

the at least one pre-determined instance of the known tooling comprises a plurality of instances; and correlating the stored derived signature and the stored at least one attribute from the individual integrated circuit using electronically readable instructions running in a processor comprises executing electronically readable instructions running in the processor to correlate the retrieved at least one electrical attribute from the individual integrated circuit to the retrieved at least one electrical attribute measured from a population of integrated circuits that were manufactured utilizing each of a plurality of pre-determined instances of the known tooling.

3. The method of claim 2, wherein the at least one pre-determined instance of the known tooling comprises a plurality of instances, the method further comprising:

collecting second data identifying the integrated circuit as having been manufactured using a particular one of the plurality of instances, the comparing being performed with respect to the signature derived from the particular one of the plurality of instances identified by the collected second data.

4. The method of claim 3 wherein the second data is collected from the indvidual integrated circuit.

5. The method of claim 3 wherein the second data is associated with the indvidual integrated circuit.

6. The method of claim 1 wherein the at least one electrical attribute is start-up values from selected ones of the static random-access memory cells on the individual integrated circuit.

7. The method of claim 6 wherein the at least one electrical attribute is start-up values from all static random-access memory cells disposed on the individual integrated circuit.

8. The method of claim 1 wherein the at least one electrical attribute is at least one of selected metal line and via resistances on the individual integrated circuit.

9. The method of claim 1 wherein the at least one electrical attribute is one of transistor on-impedance values or transistor thresholds of selected transistors on the individual integrated circuit.

10. The method of claim 1 wherein the at least one electrical attribute is relative delay variations of selected circuits on the individual integrated circuit.

11. An apparatus for determining if an individual integrated circuit was manufactured using an individual instance of known tooling, each instance having unique uncloneable variations in at least one electrical attribute as a result of their manufacture using the pre-determined instances of known tooling, the at least one electrical attribute representing an uncloneable electrical parameter associated with individual circuit features of the integrated circuit resulting from the instances of known tooling, the method comprising:

a database storing at least one signature relating to at least one electrical attribute of individual integrated circuit that varies as a function of the known tooling used to manufacture the individual integrated circuits;

an input device configured to measure from unverified individual integrated circuits the at least one electrical attribute, the input device including a die prober directly electrically contacting the integrated circuit to measure as the electrical attribute an electrical parameter of at least one component of the integrated circuit; and a processor configured to compare the at least one electrical attribute measured from a subject unverified individual integrated circuit with the signature to determine whether the subject unverified individual integrated circuit was manufactured using the individual instance of known tooling.

12. The apparatus of claim 11 wherein the processor outputs an alarm signal if it determines that the subject unverified individual integrated circuit was not manufactured using the individual instance of known tooling.

13. The method of claim 11 wherein the die prober is configured to sense start-up values from selected ones of the static random-access memory cells on the individual integrated circuit.

14. The method of claim 13 wherein the die prober is configured to sense start-up values from all static random-access memory cells disposed on the individual integrated circuit.

15. The method of claim 11 wherein the die prober is configured to sense at least one of selected metal line and via resistances on the individual integrated circuit.

16. The method of claim 11 wherein the die prober is configured to sense one of transistor on-impedance values or transistor thresholds of selected transistors on the individual integrated circuit.

17. The method of claim 11 wherein the die prober is configured to sense relative delay variations of selected circuits on the individual integrated circuit.

* * * * *

UNITED STATES PATENT AND TRADEMARK OFFICE
CERTIFICATE OF CORRECTION

PATENT NO. : 10,114,369 B2
APPLICATION NO. : 14/747758
DATED : October 30, 2018
INVENTOR(S) : G. Richard Newell and Russell Robert Garcia Page 1 of 1

It is certified that error appears in the above-identified patent and that said Letters Patent is hereby corrected as shown below:

In the Claims

In Claim 1, Column 9, Line 24, after the word "integrated" add the word --circuit--.

Signed and Sealed this
Fourth Day of June, 2019

Andrei Iancu
*Director of the United States Patent and Trademark Office*